(12) United States Patent
Andrus et al.

(10) Patent No.: US 8,602,134 B2
(45) Date of Patent: Dec. 10, 2013

(54) MODULAR MOBILE ROBOT

(75) Inventors: Lance L. Andrus, Southborough, MA (US); Brian DeStefano, Stoneham, MA (US); Scott R. Albin, Carlisle, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 13/506,581

(22) Filed: Apr. 30, 2012

(65) Prior Publication Data

US 2012/0211287 A1    Aug. 23, 2012

Related U.S. Application Data

(63) Continuation of application No. 12/316,311, filed on Dec. 11, 2008, now Pat. No. 8,201,649.

(60) Provisional application No. 61/007,681, filed on Dec. 14, 2007.

(51) Int. Cl.
*B62D 55/00* (2006.01)

(52) U.S. Cl.
USPC ............................ 180/9.48; 180/9.1; 180/9.21

(58) Field of Classification Search
USPC ......................................... 180/9.1, 9.48, 9.21
See application file for complete search history.

(56) References Cited

U.S. PATENT DOCUMENTS

| | | | |
|---|---|---|---|
| 2,926,865 A | 3/1960 | Humphreys | |
| 3,108,498 A | 10/1963 | James et al. | |
| 3,247,979 A | 4/1966 | Melton et al. | |
| 3,700,115 A | 10/1972 | Johnson et al. | |
| 4,000,784 A | 1/1977 | Morrow, Sr. et al. | |
| 4,494,441 A | 1/1985 | Magnuson | |
| 4,501,522 A | 2/1985 | Causer et al. | |
| 4,519,465 A | 5/1985 | Triplett | |
| 4,709,265 A | 11/1987 | Silverman et al. | |
| 4,738,576 A | 4/1988 | Eberle et al. | |
| 4,766,775 A | 8/1988 | Hodge | |
| 4,865,400 A | 9/1989 | Caron et al. | |
| 5,435,405 A | 7/1995 | Schempf et al. | |
| 5,451,135 A | 9/1995 | Schempf et al. | |
| 5,872,892 A | 2/1999 | Brown et al. | |
| 6,113,343 A | 9/2000 | Goldenberg et al. | |
| 6,236,906 B1 | 5/2001 | Muller | |
| 6,283,220 B1 | 9/2001 | Carter | |
| 6,431,296 B1 | 8/2002 | Won | |

(Continued)

FOREIGN PATENT DOCUMENTS

EP    0 723 905 A1    7/1996

OTHER PUBLICATIONS

PCT Written Opinion of the International Searching Authority, PCT Application No. PCT/US2008/013608, Feb. 11, 2009, nine (9) pages (unnumbered).

*Primary Examiner* — Kevin Hurley
*Assistant Examiner* — Michael Stabley
(74) *Attorney, Agent, or Firm* — Iandiorio Teska & Coleman, LLP

(57) ABSTRACT

A modular mobile robot with a chassis including a power source housed therein. Right and left hand track modules are each removeably coupled to the robot chassis. Each track module includes a side plate, at least one drive wheel rotatable with respect to the side plate, a motor for driving the drive wheel, at least one idler rotatable with respect to the side plate, and a track extending around the drive wheel, the side plate, and the idler. A turret assembly with its own turret drive subsystem is removeably coupled to the robot chassis via a quick release mechanism.

22 Claims, 17 Drawing Sheets

(56) References Cited

U.S. PATENT DOCUMENTS

| | | |
|---|---|---|
| 6,491,127 B1 | 12/2002 | Holmberg et al. |
| 6,668,951 B2 | 12/2003 | Won |
| 6,840,338 B2 | 1/2005 | Bowers et al. |
| 6,999,849 B2 | 2/2006 | Bridges |
| 7,588,106 B2 | 9/2009 | Koskinen |
| 7,597,162 B2 | 10/2009 | Won |
| 7,798,260 B2 | 9/2010 | Albright et al. |
| 2005/0204850 A1 | 9/2005 | Nihei et al. |
| 2006/0156852 A1 | 7/2006 | Haniya |
| 2006/0192515 A1 | 8/2006 | Takayama et al. |
| 2007/0107917 A1 | 5/2007 | Doherty et al. |
| 2007/0169968 A1 | 7/2007 | Todd et al. |
| 2008/0029317 A1 | 2/2008 | Sallen Rosello et al. |
| 2008/0083344 A1 | 4/2008 | Deguire et al. |
| 2008/0156548 A1 | 7/2008 | Mallette et al. |
| 2008/0277172 A1 | 11/2008 | Ben-Tzvi et al. |
| 2009/0071281 A1 | 3/2009 | Fisk et al. |
| 2009/0107917 A1 | 4/2009 | Capehart |
| 2009/0129003 A1 | 5/2009 | Bruck et al. |
| 2009/0164045 A1 | 6/2009 | Deguire et al. |
| 2009/0229894 A1 | 9/2009 | Roucka |
| 2010/0212482 A1 | 8/2010 | Morin et al. |
| 2010/0263524 A1 | 10/2010 | Morin et al. |

MODULAR MOBILE ROBOT

RELATED APPLICATIONS

This application is a continuation of prior U.S. patent application Ser. No. 12/316,311 filed Dec. 11, 2008 now U.S. Pat. No. 8,201,649 under 35 U.S.C. §119, 120, 363, 365 and 37 C.F.R. §1.55 and §1.78, which claims the benefit of and priority to U.S. Provisional Application Ser. No. 61/007,681, filed on Dec. 14, 2007 under 35 U.S.C. §§119, 120, 363, 365, and 37 C.F.R. §1.55 and §1.78.

FIELD OF THE INVENTION

The subject invention relates to modular robots, typically remotely controlled mobile robots.

BACKGROUND OF THE INVENTION

Remotely controlled mobile robots are useful in a variety of applications and include military, police, fire, SWAT, and other users. Some robots have articulatable arms; others are equipped with weapons. Many have sensors, cameras, and the like. Some robots have wheels while others have tracks. In general, the robot chassis (or frame or body) is often ill-defined.

For example, U.S. Pat. No. 6,431,296 discloses a robotic platform with a main body including three tubes rigidly connecting the track side plates. The motors, drive pulleys, chains, and other mechanisms for driving the tracks are typically housed by the the like associated with the robot chassis and the track side plates. Components of the tracks cooperate with components of the robot chassis in a way that makes repair and replacement of the tracks, motors, and other components difficult. The design of the chassis and tracks are usually unique as between different robots and different manufacturers.

Robots with turrets and arms are also typically designed such that the turret and arm assemblies are unique in design for each robot chassis. In the assignee's "Talon" robot, for example, the arm assembly is not easily removable from the robot chassis. Robots with turrets also typically include a drive motor housed by the robot chassis. Therefore, it is typically not possible to easily remove the turret from such robots. A turret designed for one robot chassis cannot typically be used with another robot chassis.

Finally, in the design of small mobile robots, it is important that the chassis not be too wide or else the robot may become high centered when it traverses rocks and other obstacles. A narrower chassis is also preferred for robots which are designed to climb stairs and operate in close confines. Wider, more closely spaced tracks prevent the high centering problem but limit access to the chassis and the components and subsystem housed thereby, notably the batteries providing power for the robot drive and other subsystems.

The following co-pending patent applications by the applicant hereof are hereby incorporated herein by this reference: U.S. patent application Ser. Nos. 11/901,200 filed Sep. 13, 2007; 11/543,427 filed Oct. 5, 2006; 11/732,875 filed Apr. 5, 2007; 11/787,845 filed Apr. 18, 2007; 12/004,173 filed Dec. 19, 2007 and U.S. Provisional Patent Application Ser. No. 60/994,414 filed Sep. 19, 2007.

BRIEF SUMMARY OF THE INVENTION

It is therefore an object of this invention to provide a new robot with a more modular design.

It is a further object of this invention to provide such a robot which is preferably highly mobile and controlled remotely and wirelessly from an operator control unit.

It is a further object of this invention to provide such a robot which allows for repair, replacement, and refurbishment, possibly even in the field, of the primary robot components.

It is a further object of this invention to provide such a robot which includes, in one embodiment, fairly wide, fairly closely spaced tracks to reduce high centering and for maneuverability in close confines.

It is a further object of this invention to provide such a robot which, in one embodiment, includes track modules which can be spread outward with respect to the chassis to access the interior of the chassis.

It is a further object of this invention to provide such a robot which, in one embodiment, includes track modules which are self contained and easily decoupled from and coupled to the robot chassis.

It is a further object of this invention to provide such a robot which includes, in one embodiment, a turret which is also self contained and easily decoupled from and coupled to the robot chassis.

It is a further object of this invention to provide such a robot which, in one embodiment, is designed to accept different turret configurations, e.g., turrets carrying weapons and turrets with arms.

It is a further object of this invention to provide such a robot which includes, in one embodiment, a novel suspension subsystem.

It is a further object of this invention to provide such a robot which includes, in one embodiment, a novel track tensioning mechanism which allows the tracks to be quickly removed and replaced.

The subject invention results from the realization, in part, that a truly modular robot platform includes, in one example, a chassis housing the robot electronic and power subsystems, self contained track modules removeably coupled to the robot chassis, and a self contained turret assembly which is also removable from the robot chassis.

The subject invention, however, in other embodiments, need not achieve all these objectives and the claims hereof should not be limited to structures or methods capable of achieving these objectives.

The subject invention features a modular mobile robot chassis comprising a power source, and right and left hand track modules each removeably coupled to the robot chassis. Each track module includes a side plate, at least one drive wheel rotatable with respect to the side plate, a motor for driving the drive wheel, at least on idler rotatable with respect to the side plate, and a track extending around the drive wheel, the side plate, and the idler. A turret assembly includes its own turret drive subsystem and is removeably coupled to the robot chassis via a quick release mechanism.

In one example, both track module side plates are removeably coupled fore and aft to the robot chassis via couplings. The aft couplings may be hinges with removable hinge pins. Each hinge includes a pair of spaced ears coupled to the robot chassis, a sleeve coupled to the side plate and rotatably disposed between the ears, and a hinge pin extending between both ears and the sleeves. In one example, the fore couplings are clamp assemblies. Each clamp assembly includes a cam follower releasably urged against a portion of the robot chassis. Typically, the cam follower extends from a clamping bracket including a dowel pin spaced from the cam follower for receiving a shelf portion of the robot chassis. Each clamp assembly may further include a clamping bracket coupled to a track side plate and including a bore therethrough having a first longitudinal central axis. A cam throw sleeve is secured to the cam follower and includes a bore therethrough having a second longitudinal central axis offset from the first longitudinal access, and a handle for rotating the cam throw sleeve and the cam follower to engage the shelf portion of the robot chassis. In one preferred embodiment, each clamp assembly further includes a cam locking sleeve about the cam follower and within the cam throw sleeve. The cam locking sleeve includes a bore therethrough having a third longitudinal central axis adjustable with respect to the first and second longitudinal central axes to vary the clamping force of the clamp assembly. Typically, the cam locking sleeve includes a plurality of orifices therethrough corresponding in location to at least one orifice through the cam throw sleeve and a fastener through at least one orifice in the cam throw sleeve and a chosen orifice of the plurality of orifices in the cam locking sleeve to secure the cam locking sleeve with respect to the cam through sleeve.

The robot chassis may include at least one suspension device between a side plate and a coupling. One preferred suspension device includes a suspension cartridge comprising a base plate secured to the side plate including a pin and spaced damping pads and a pivot plate attached to the coupling and including an orifice which receives the pin of the base plate and a tang received between the spaced damping pads. Typically, there is a suspension cartridge between each coupling and its respective side plate.

Each track module may further include a tensioner for the idler. One preferred tensioner includes a tension block abutting a portion of the track module, a slide block for the idler, and a tension adjuster coupled to the slide block and extendable and retractable with respect to the tension block. The preferred tensioner further may include a plunger coupled on one end to the slide block and extending within and secured to the tension adjuster.

Typically, the turret includes a pintle extending therefrom, the robot chassis includes a pintle receiver, and the quick release mechanism includes a ball lock releasably securing the pintle in the pintle receiver. The robot chassis may include one or more electronic connectors and the turret includes one or more corresponding electronic connectors each electronically connected to a slip ring associated with the turret.

Each track may include cut-outs where the idlers engage the track to prevent debris from building up on the idler, or track. Each track module may further include a lubricious member guiding the track. Also, at least one kickstand is provided for raising the robot chassis to remove the tracks and/or track modules.

The subject invention also features a modular mobile robot comprising a robot chassis and left and right track modules removeably attached to the robot chassis. Each track module preferably includes at least one drive wheel, a motor for driving the drive wheel, at least one idler, and a track extending around the drive wheel, the side plate, and the idler.

Each track module may further include a tensioner for removing the track and adjusting the tension of the track. A turret assembly may be included and is removeably coupled to the robot chassis. In one preferred design, the robot chassis defines a battery cavity and the track modules are spreadable form the battery cavity via hinges attaching the track modules to the robot chassis to access the battery cavity. Clamp assemblies can be used to releasably lock the track modules in place on the robot chassis. Suspension modules between the track modules and the robot chassis are also typically included. The present design of a modular mobile robot in accordance with the subject invention features a robot chassis, self contained left and right track modules removeably attached to the robot chassis each including a tensioner for removing the track and adjusting the tension of the track and suspension modules between the track modules and the robot chassis, and a self contained turret assembly removeably coupled to the robot chassis.

One preferred robot chassis defines a battery cavity and the left and right track modules are spreadable with respect to the chassis via hinges attaching the track modules to the robot chassis to access the battery cavity. Clamp assemblies releasably lock the track modules in place on the robot chassis. In the present design, each track module includes a side plate, at least one drive wheel rotatable with respect to the side plate, a motor for driving the drive wheel, at least one idler rotatable with respect to the side plate, and a track extending around the drive wheel, the side plate, and the idler. When this design is employed, each hinge typically includes a pair of spaced ears coupled to the robot chassis, a sleeve coupled to the side plate and rotatably disposed between the ears, and a hinge pin extending through both ears and the sleeve. A clamp assembly for each track side plate releasably couples each track module to the robot chassis. One preferred clamp assembly includes a cam follower releasably urged against a portion of the robot chassis.

A new mobile robot in accordance with the subject invention includes a robot chassis defining a battery cavity; left and right track modules each including a side plate, at least one drive wheel rotatable with respect to the side plate, a motor for driving the drive wheel, at least one idler rotatable with respect to the side plate, and a track extending around the drive wheel, the side plate, and the idler; a hinge attaching each track module to the robot chassis; and a clamp assembly for each track module releasably coupling the track module to the robot chassis.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
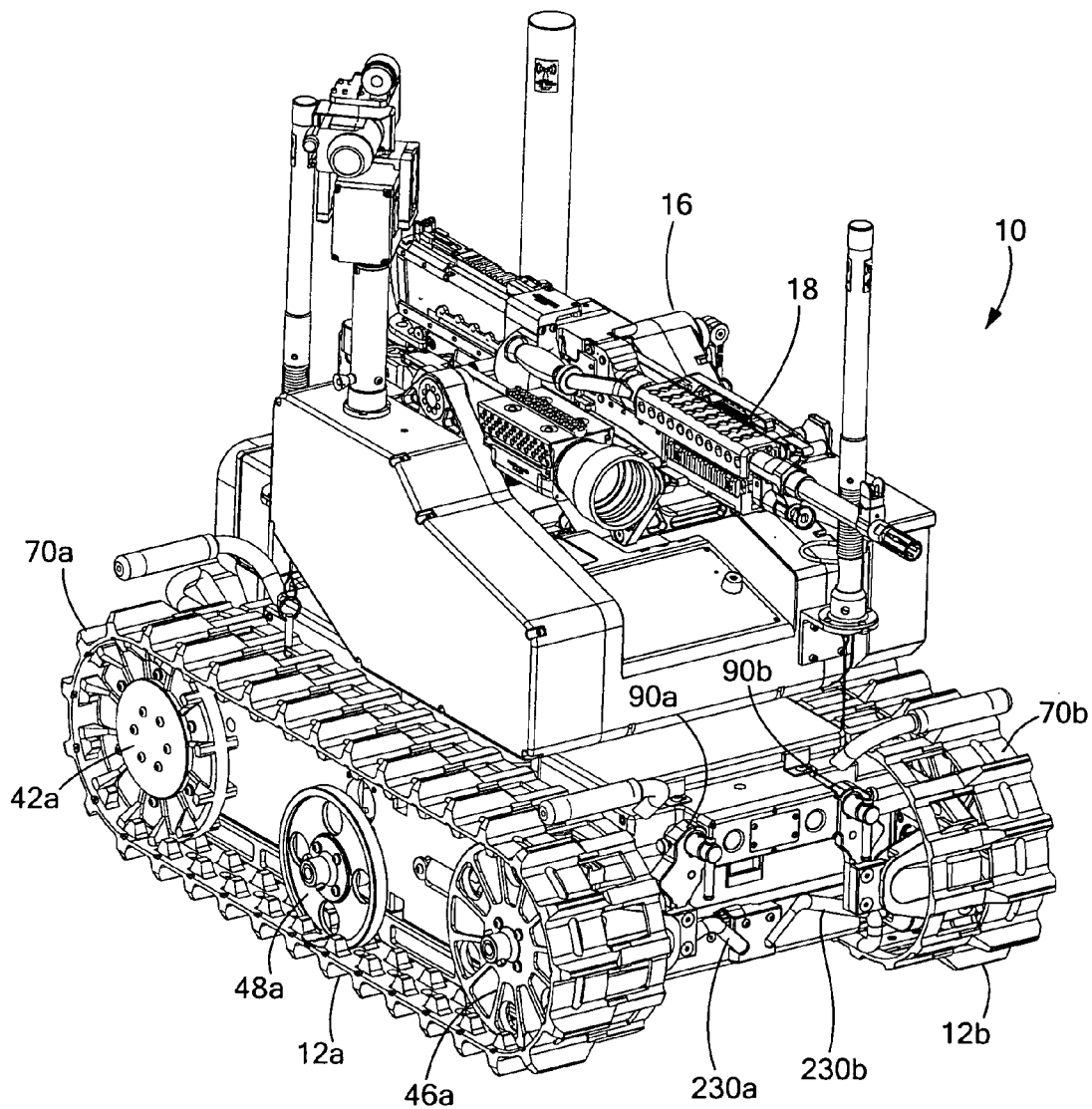
FIG. 1 is a schematic three-dimensional front view of an example of a modular robot in accordance with the subject invention.

Aside from the preferred embodiment or embodiments disclosed below, this invention is capable of other embodiments and of being practiced or being carried out in various ways. Thus, it is to be understood that the invention is not limited in its to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of modular mobile robot 10 in accordance with the subject invention. Preferably, right hand and left hand track modules 12a and 12b are similarly configured and are removeably coupled to robot chassis 14, FIG. 2. The preferred track modules are fully self-contained (e.g., the only required electrical connection between the track modules and the chassis is a pair of cables providing power and feedback to the motors driving the tracks).

Figure 2:
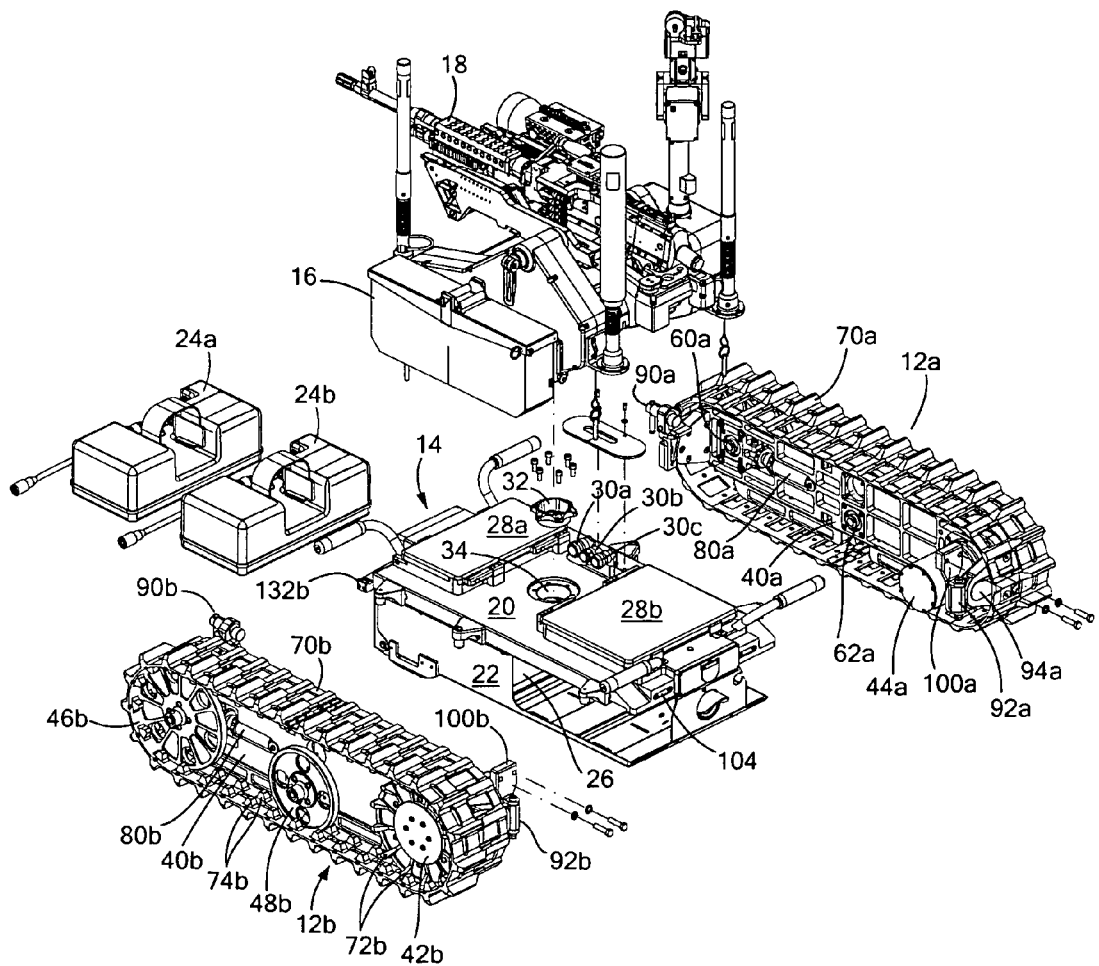
FIG. 2 is a schematic three-dimensional exploded rear view of the modular robot shown in FIG. 1 depicting the primary modules associated with a robot in accordance with the subject invention.

Turret 16, FIGS. 1 and 2 is similarly removable from chassis 14 preferably via a quick release mechanism such as a lockable ball lock. The turret is also typically fully self contained and includes, for example, its own motor for rotating the rotatable part of the turret. A few cables extend between the robot chassis and the turret to provide signals between the electronic subsystems housed by the robot chassis and the electronic subsystems of the turret (e.g., cameras, weapon electronics, arm motors, and the like). The particular turret shown in FIGS. 1 and 2 supports weapon 18 and is available from Precision Remotes, 1230 Brickyard Cove, #104, Point Richmond, Calif. 94801. But, other turrets, e.g., turrets carrying robot arms with end effectors and the like, can be used in connection with robot 10 chassis 14.

In this way, should track modules 12a and 12b and/or should turret 16 and/or chassis 14 become damaged, should different track modules or turrets be desired, or should repair, refurbishment, or replacement operations become necessary, the major subsystems associated with robot 10 are easily removable and replaceable due to the modular design of the primary robot components.

In this specific design shown in FIGS. 1-2, chassis 14 includes top plate 20 and body portion 22 housing a power source such as batteries 24a and 24b within cavity 26. The batteries are easily removed from chassis 14 for recharging or replacement as explained infra. Electronic subassemblies such as drive motor electronics, fire control electronics, microprocessor(s), transmitters, receivers, and the like are housed in electronic compartments 28a and 28b. Removal of turret 16 also allows easy access to these compartments for repair, maintenance, and refurbishment operations.

Connections 30a, 30b and 30c allow electrical connections to be made from chassis 14 to turret 16 via similar connections associated therewith. From there, a slip ring associated with turret 16 allows electrical signals to proceed to and from the moveable portion of turret 16. A pintle associated with turret 16 is received in pintle receiver 32 located within receiver orifice 34 in chassis 14 top plate 20. A quick release mechanism releasably locks the turret pintle in the pintle receiver 32.

The Preferred Track Modules

Figure 3:
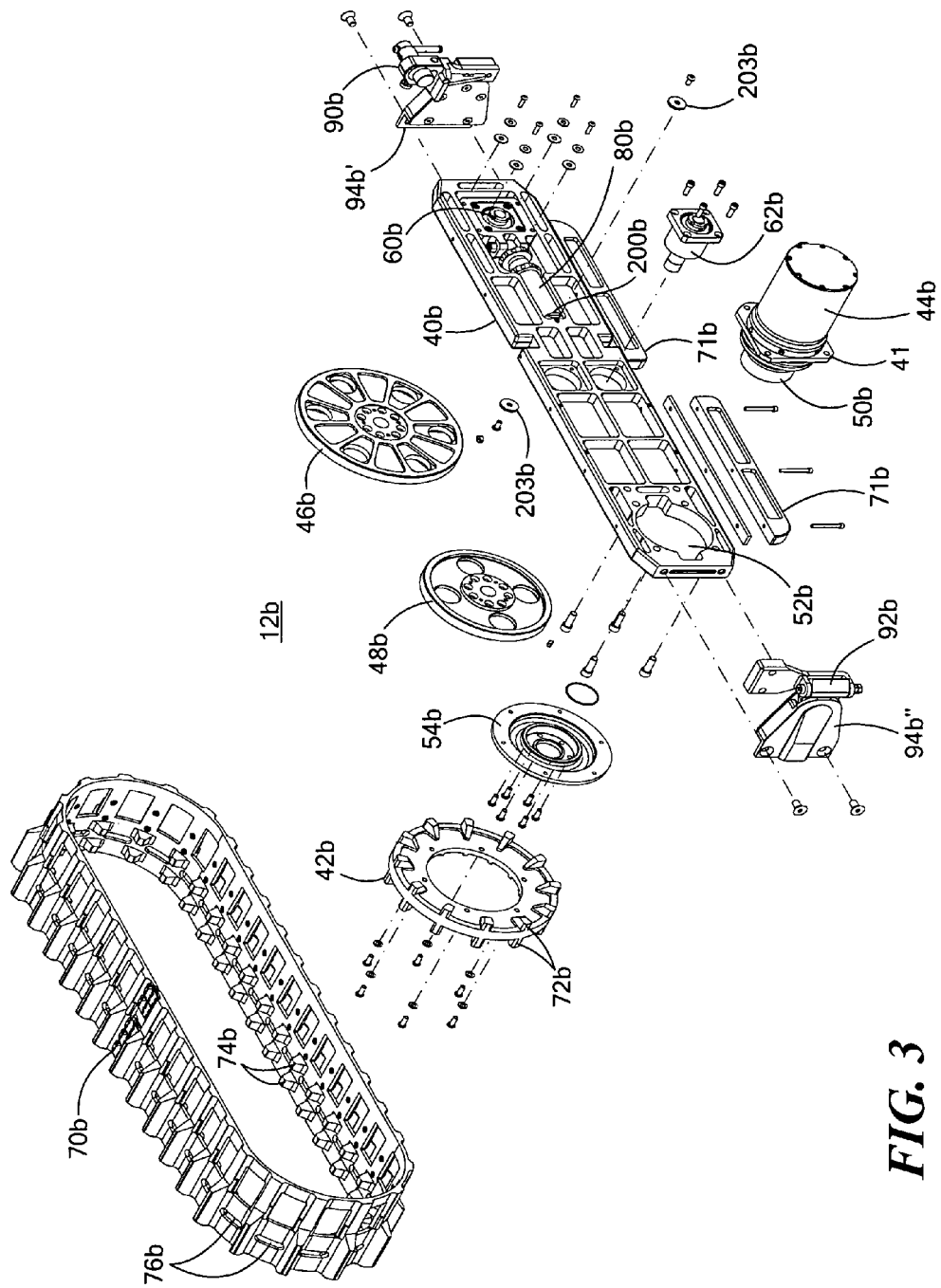
FIG. 3 is a schematic three-dimensional exploded side view of the left hand track module of the robot shown in FIGS. 1-2.

Each track module in this particular embodiment includes, as shown for track module 12b, FIG. 3, a side plate 40b, drive wheel 42b rotatable with respect to side plate 40b, motor 44b for driving drive wheel 42b, and idlers 46b and 48b also both rotatable with respect to side plate 40b. In FIGS. 1-2, corresponding reference numbers are used for the similarly configured track module 12a. Motor 44b, FIG. 3 is bolted to side plate 40b and driven hub 50b extends through orifice 52b through side plate 40b. Motor hub 50b is coupled to the rotating drive wheel hub 54b fastened to drive wheel 42b. Flange 41 is a non-rotatable portion of drive motor 44b and is fastened to side plate 40b. Idlers 46b and 48b are coupled to bearing blocks 60b and 62b, respectively, each fastened to side plate 40b.

Track 70b extends around drive wheel 42b, side plate 40b and idlers 48b and 46b. Cogs 72b of drive wheel 42b engage drive lugs 74b associated with tracks 70b. Idlers 46b and 48b reside between adjacent lugs 74b as shown in FIG. 2.

Cutouts or slots 76b in track 70b are positioned where drive wheel 42b, and/or idlers 46b and 48b engage track 70b to prevent debris from building up on the track, drive wheel, and the idlers, thereby minimizing detracking. Track guides 71b are made of a lubricious material such as high density polyethylene.

Each track module 12b, FIG. 3 also preferably includes tensioner assembly 80b for adjusting the tension on track 70b via moveable idler 46b and for quickly removing and replacing tracks 70b In this way, each track module is fully self contained and can be quickly removed from and assembled onto the robot chassis.

In the particular design shown in FIGS. 1-3, side plates 40a and 40b are removeably coupled fore and aft to robot chassis 14 via forward couplings 90a and 90b and rearward couplings 92a and 92b. Also, as shown more clearly in FIG. 3, there is a suspension cartridge associated with each coupling. Thus, suspension cartridge 94b' is associated with forward coupling 90b and suspension cartridge 94b" is associated with aft coupling 92b. The suspension cartridges are fastened to the track module side plates and the couplings are fastened to the suspension cartridges and (releasably) to the robot chassis.

The Preferred Rearward Coupling and Suspension Design

Figure 4:
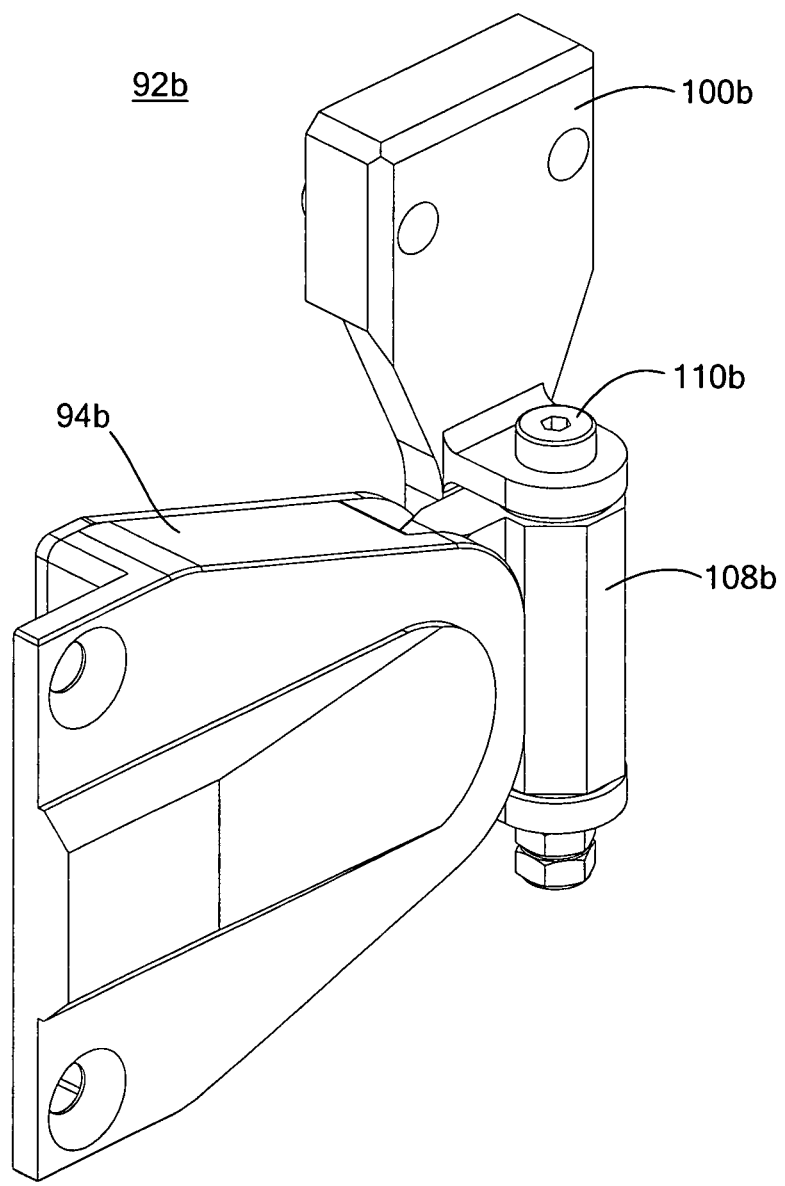
FIG. 4 is a schematic three-dimensional front view showing a suspension cartridge for the robot shown in FIGS. 1-2 and also the rear hinge assembly of the left hand track module shown in FIG. 3.
Figure 5:
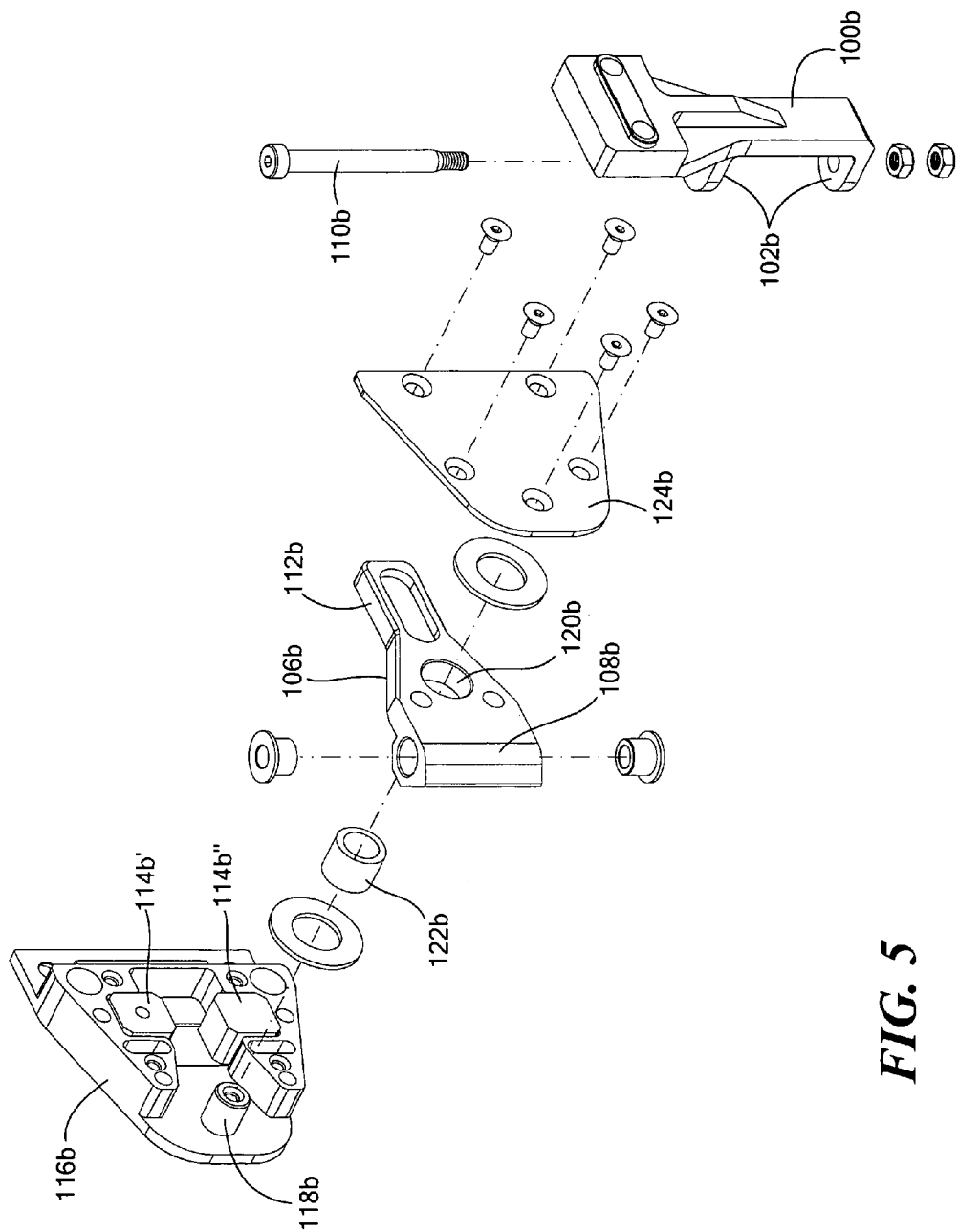
FIG. 5 is a schematic three-dimensional exploded side view showing the primary components associated with the suspension cartridge and hinge assembly of FIG. 4.
Figure 6:
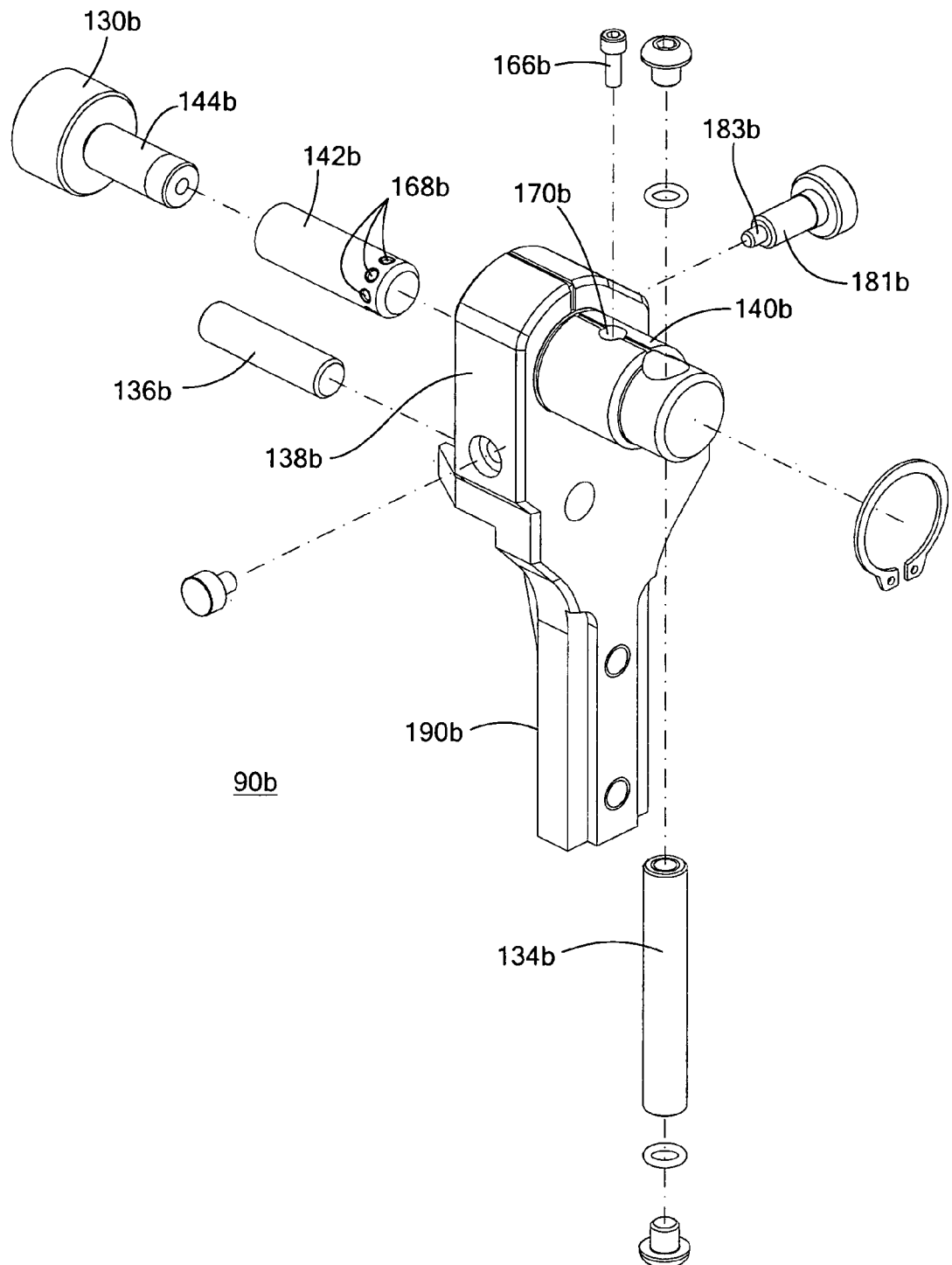
FIG. 6 is a schematic three-dimensional exploded side view showing the primary components associated with a clamp subassembly for the forward portion of the track module shown in FIGS. 1-2.

FIGS. 4-5 show aft coupling hinge assembly 92b including hinge bracket 100b with spaced ears 102b. Hinge bracket 100b is attached to the robot chassis at location 104, FIG. 2.

Double pivot plate 106b, FIGS. 4-5 includes sleeve 108b rotatably disposed between ears 102b via hinge pin 110b extending through both ears 102b and sleeve 108b. Double pivot plate 106b further includes tang 112b pivotably disposed between spaced damping pads 114b' and 114b" of base plate 116b. Pin 118b equipped with rubber pivot sleeve 122b extends through orifice 120b in double pivot plate 106b so pivot plate 106b tang 112b can rock between dampers 114b' and 114b". Cover plate 124b completes suspension cartridge 94b. The suspension cartridge thus allows for damped movement of the track module relative to the robot chassis.

Hinge bracket 100b is attached to the robot chassis and suspension cartridge 94b is attached to the track module via base plate 116' in a way that provides a suspension for the track module (sleeve 108b is coupled to the track module side plate via base plate 116 between damping pads 114b' and 114b"). Quick release of the track module from the chassis is effected when hinge pin 110b is removed.

The Preferred Forward Coupling and Suspension Module Design

Figure 7:
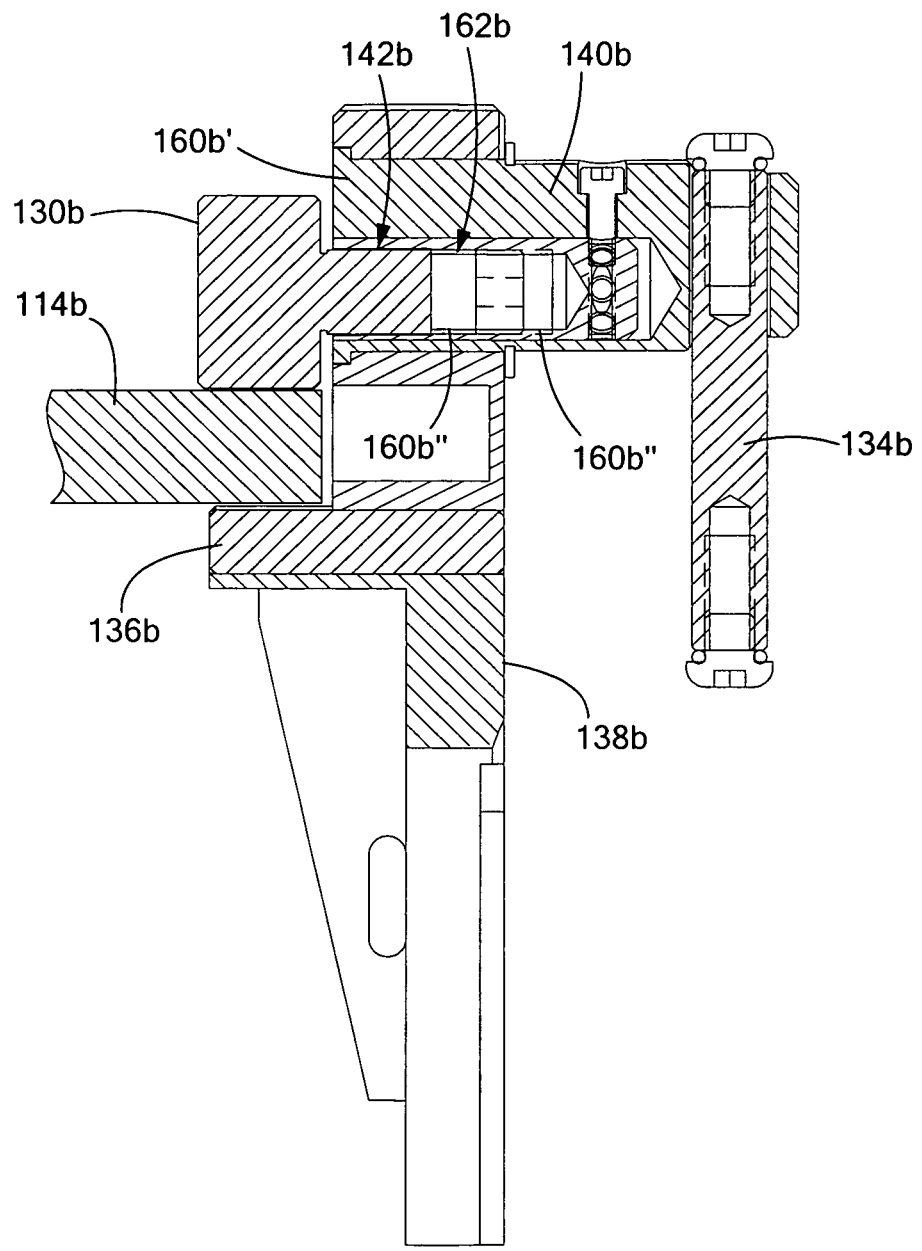
FIG. 7 is a schematic cross-sectional side view of the clamp assembly shown in FIG. 6.
Figure 8:
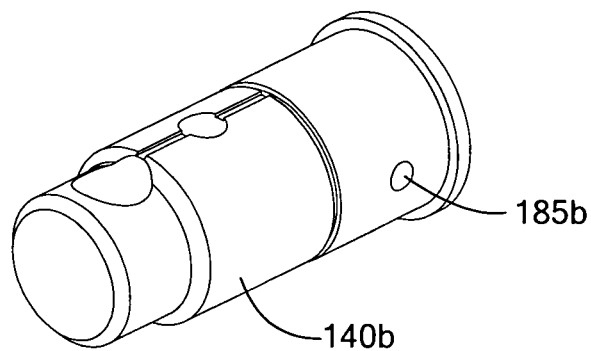
FIG. 8 is a schematic three-dimensional view of the throw cam sleeve component of the clamp subassembly shown in FIGS. 6-7.

The forward couplings 90a and 90b, FIGS. 1-2 are preferably clamp assemblies as shown in FIGS. 6-10 for clamp assembly 90b. Cam follower 130b releasably engages shelf portion 132b, FIG. 10 of robot chassis 14 as also shown in FIG. 7. Rotating handle 134b in one direction urges cam follower 130b against the robot chassis shelf portion 132 locking it between cam follower 130b and dowel pin 136b of clamp bracket 138b spaced from cam follower 130b.

The preferred clamp bracket further includes cam throw sleeve 140b and cam locking sleeve 142b. Stem 144b of cam follower 130b is secured within cam locking sleeve 142b itself secured within cam throw sleeve 140b via bolt 166b.

Figure 9:
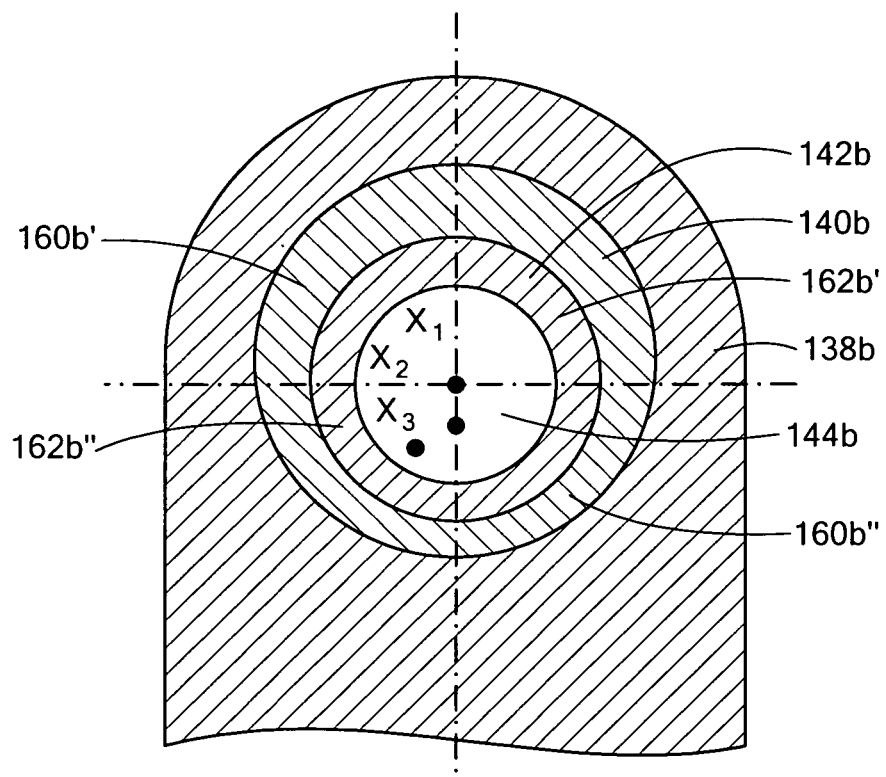
FIG. 9 is a schematic cross-sectional front view of the clamp assembly shown in FIG. 6.

As shown more clearly in FIG. 9, the bore orifice in clamping bracket in 138b which receives cam throw sleeve 140b has a first longitudinal central axis $x_1$. The bore of cam throw sleeve 140b (which receives cam locking sleeve 142b) has a longitudinal central axis $x_2$ offset from central access $x_1$. The bore of cam locking sleeve 142b (which receives cam follower 130b stem 144b) has still a different longitudinal central axis $x_3$.

FIG. 7 shows how cam throw sleeve 140b has a thicker portion 160b' and a thinner portion 160b". Similarly, FIG. 7 shows how cam locking sleeve 142 has a thicker portion 162b' and a thinner portion 162b". By rotating cam locking sleeve 142b within cam throw sleeve 140b and fixing it in place therein via fastener 166b through one of the several orifices 168b through cam locking sleeve 142b and orifice 170b through cam throw sleeve 140b, the position of the bore axis $x_3$ of locking sleeve 142 can be set with respect to the bore axis $x_2$ of cam throw sleeve 140b to vary the clamping force of the clamping assembly.

Figure 10:
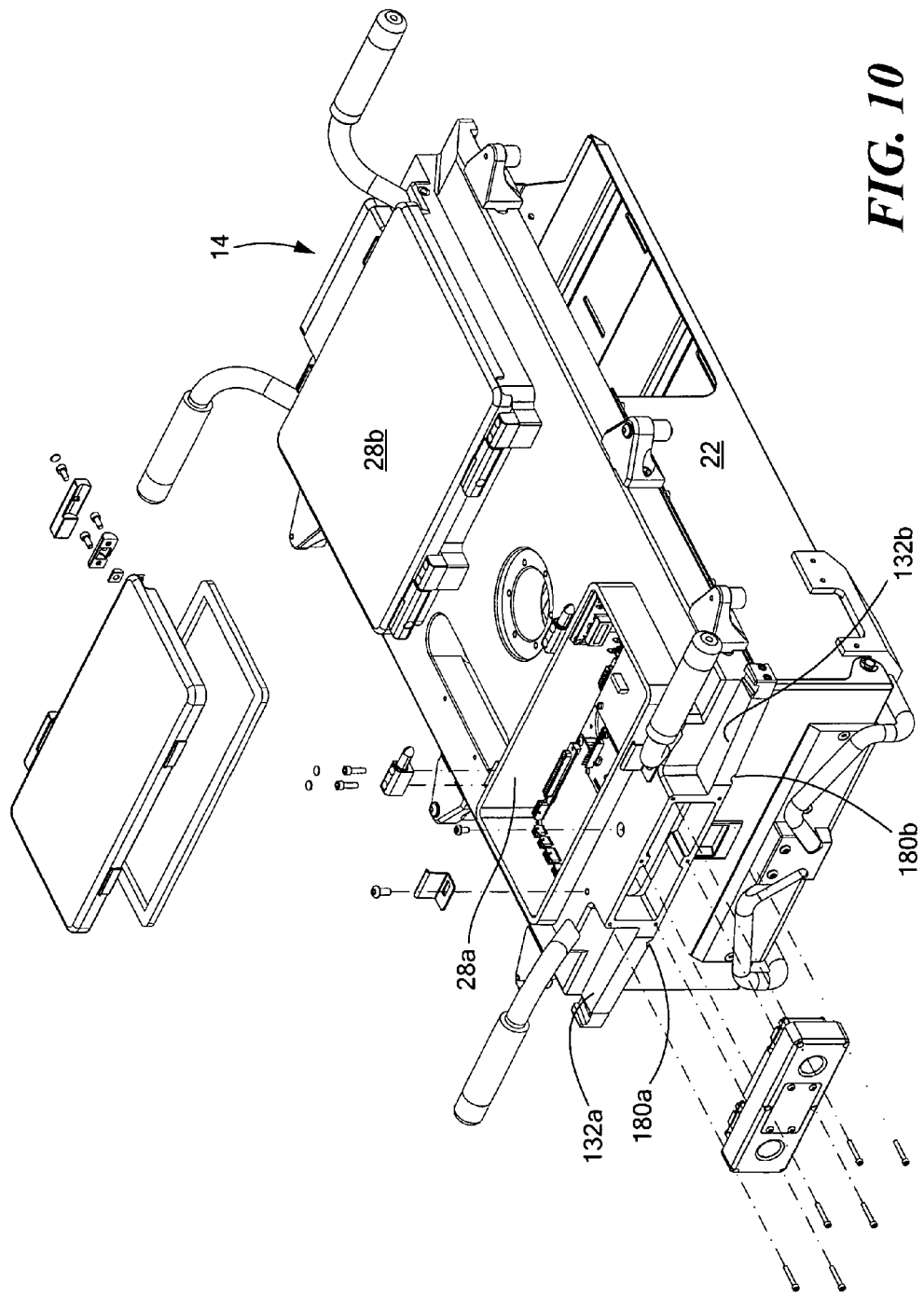
FIG. 10 is a schematic three-dimensional front view of the chassis module of the robot shown in FIGS. 1-2.

The forward portion of the track modules are released from the robot chassis by turning handle 134b whereupon cam follower 130b is no longer urged tightly against the top portion of shelf 132b, FIG. 10. Half-round cavity 180b in the bottom of shelf portion 132b receives dowel pin 136b, FIGS. 6-7 when the track module is correctly positioned on the chassis. Further, detent 181b, FIG. 6 with spring-loaded plunger 183b, engages hole 185b, FIG. 8, in cam throw sleeve 140b to lock the clamp in the closed position.

Figure 11:
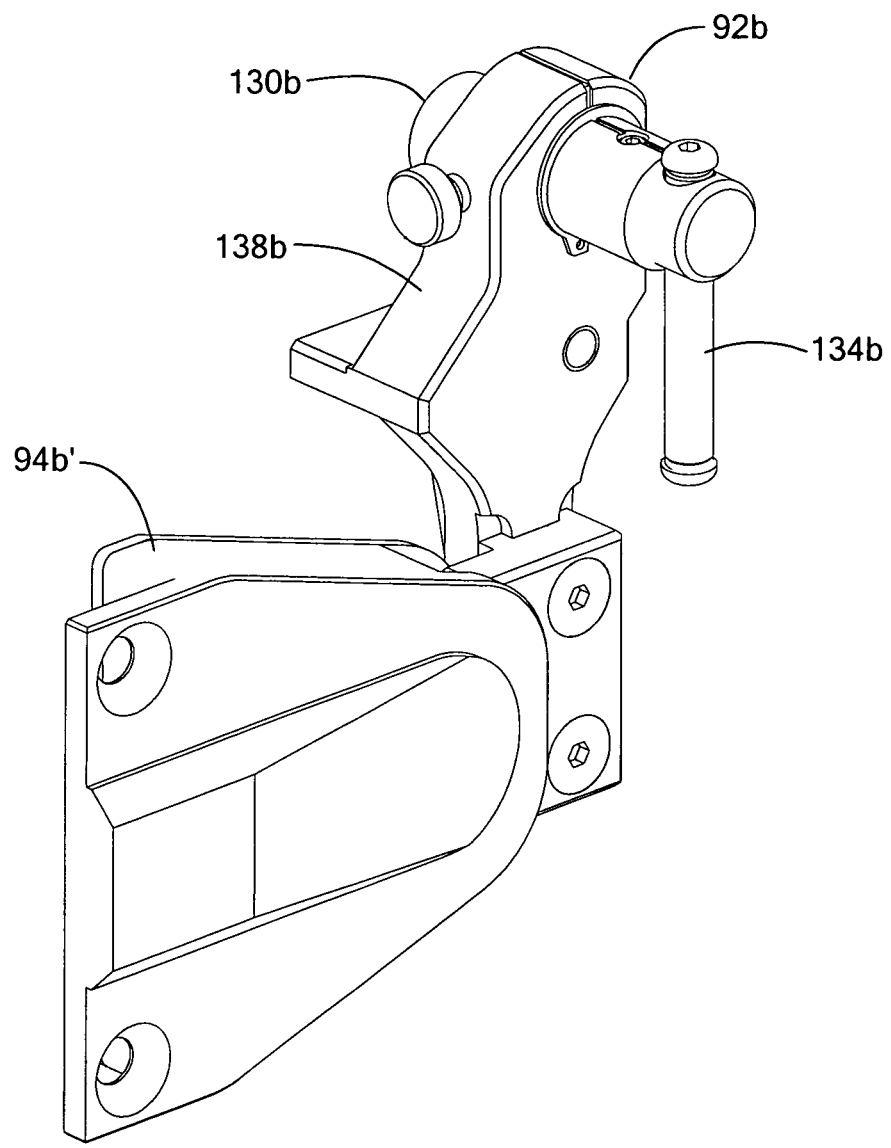
FIG. 11 is a schematic three-dimensional front view of the clamp assembly shown in FIGS. 6-9 coupled to a suspension cartridge similar in design to the suspension cartridge shown in FIGS. 4-5.
Figure 12:
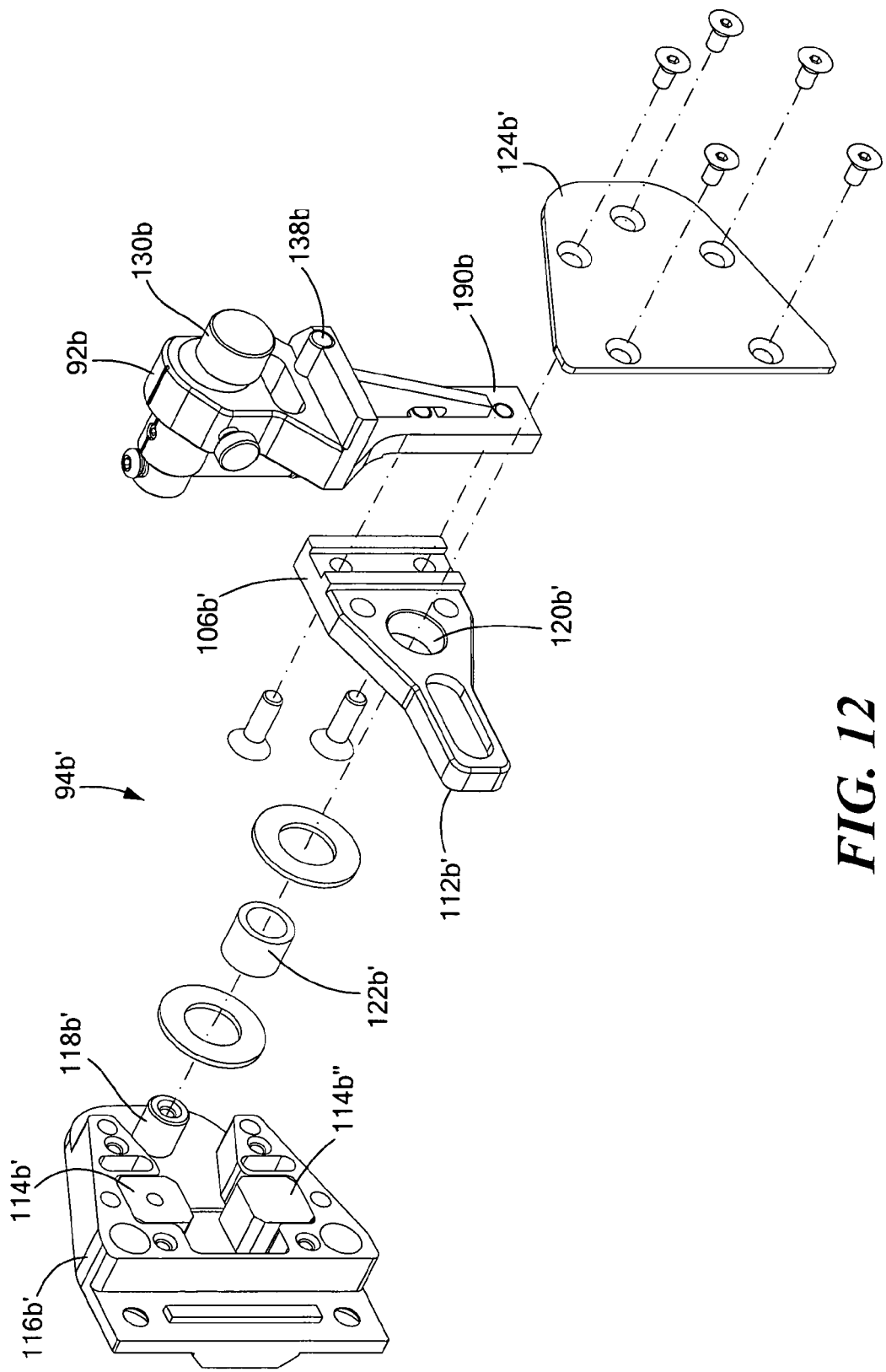
FIG. 12 is a schematic three-dimensional front exploded view of the clamp assembly and suspension cartridge design of FIG. 11.

FIGS. 11-12 further show how clamp bracket 138b includes suspension mount 190b coupled to a suspension cartridge 94b' similar in design to suspension cartridge 94b, FIG. 5. Thus, similar reference numbers are used in FIGS. 11-12 for the suspension cartridge. Clamp 92b via suspension mount 190b is thus releasably coupled to the robot chassis and the track module via suspension cartridge 94b' coupled to the track module side plate via end plate 116b'. Preferably, a similarly configured suspension cartridge is provided for each releasable coupling between the robot chassis and the track modules. Thus, in the preferred embodiment, the suspension cartridges are all similar as are the right hand and left hand track modules.

The Preferred Track Tensioner Assembly

Figure 13:
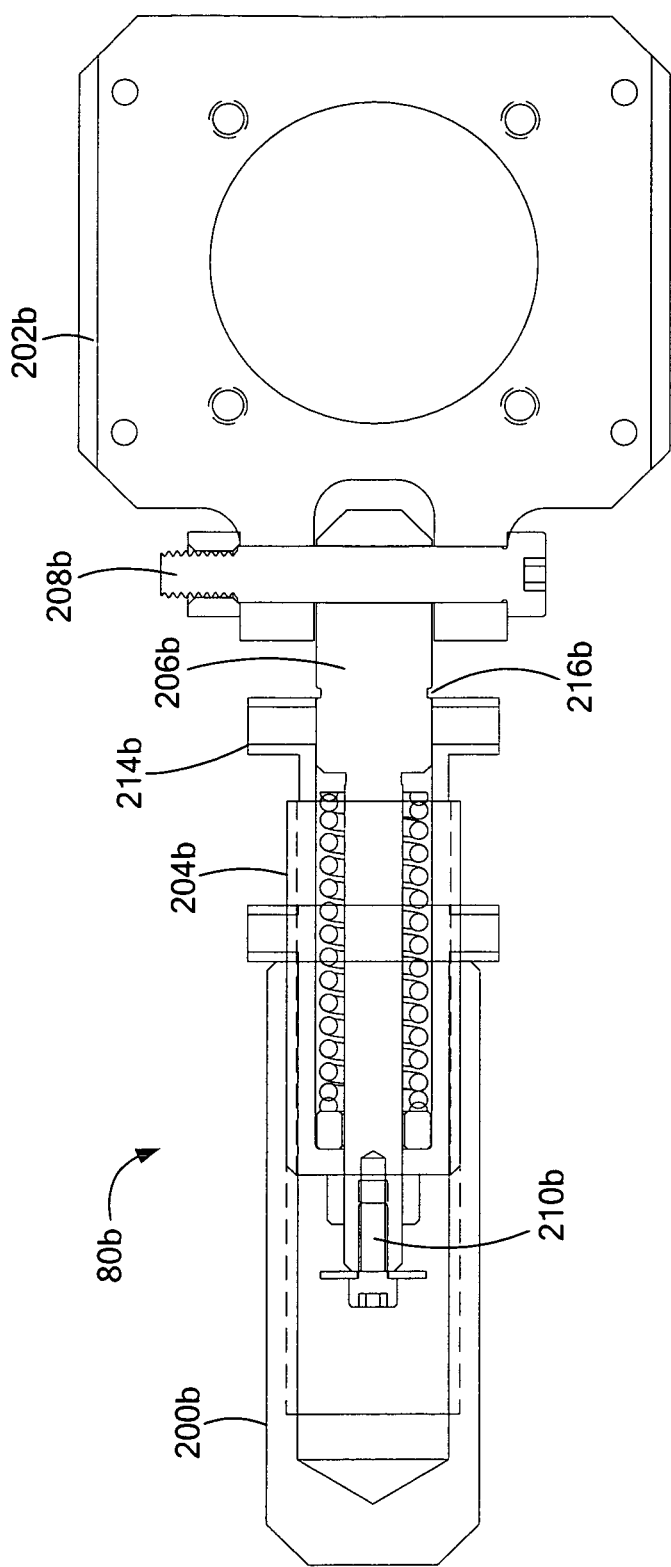
FIG. 13 is a schematic cross-sectional front view of a track tensioner mechanism for the robot shown in FIGS. 1-2.
Figure 14:
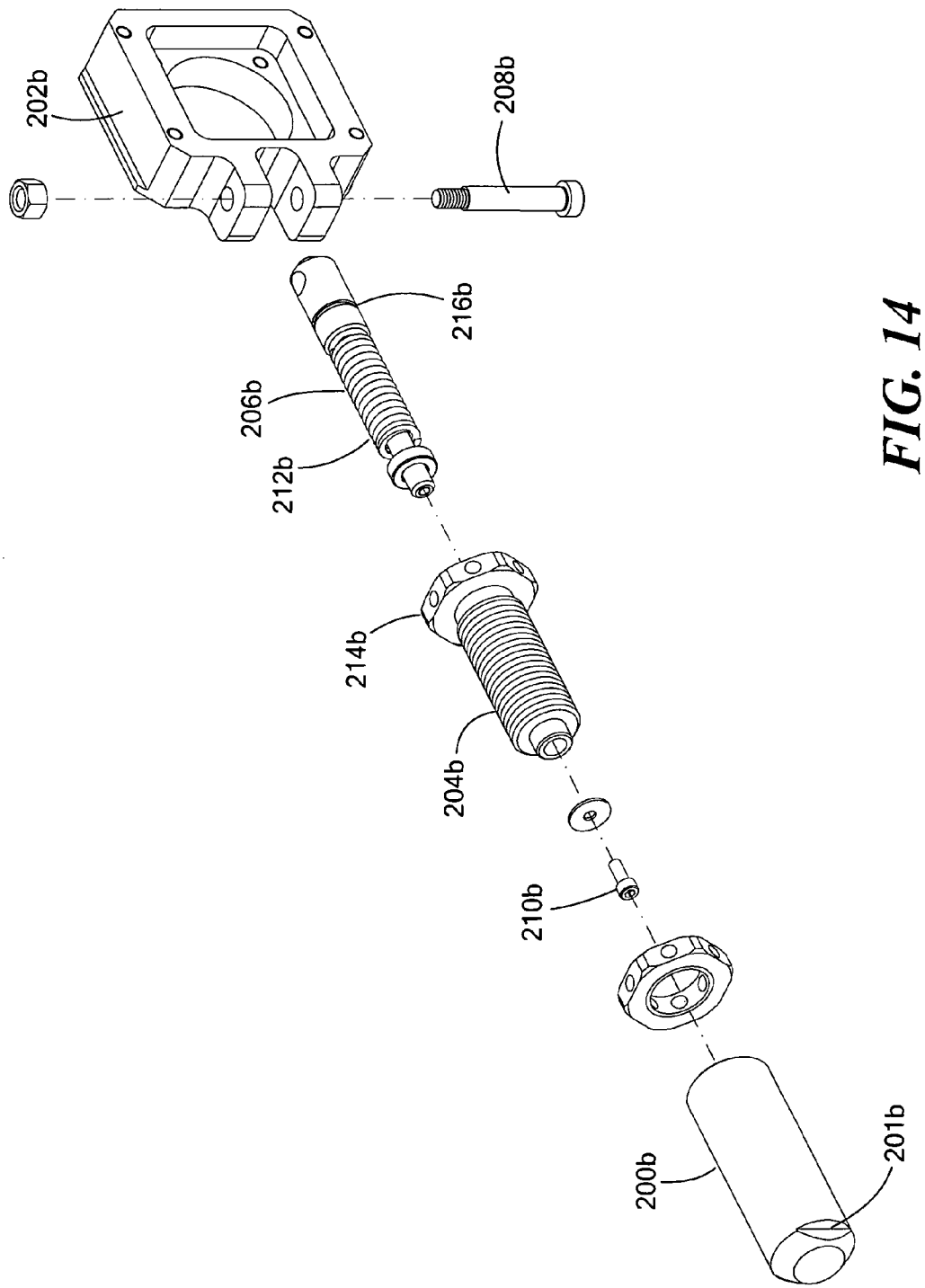
FIG. 14 is a schematic three-dimensional exploded view showing the primary components associated with the tensioner assembly of FIG. 13.

One example of an idler tension assembly 80b, FIGS. 2 and 3 is further described in reference to FIGS. 13-14. Tension block 200b abuts a portion of track module side plate 40b as shown in FIG. 3. Idler bearing cartridge 60b is received in slide block 202b, FIGS. 13-14. Tension adjuster 204b is coupled to slide block 202b via plunger 206b and tension adjuster 204b is extendable and retractable with respect to tension block 200b by virtue of external threads on tension adjuster 204b and corresponding internal threads inside tension block 200b. Plunger 206b is rotatably pinned to slide block 202b via shoulder screw 208b and is secured within tension adjuster 204b via screw 210b. Thus, the position of idler 46b, FIG. 2 with respect to side plate 40b can be varied.

Proper tension is provided via spring 212b, FIGS. 13-14 about plunger 206b and via the position of tension adjuster 204b within tension block 200b when nut feature 214b is located close to indicator groove 216b on plunger 206b. To decrease the tension on the track for removal, nut feature 214b on tension adjuster 204b is turned clockwise a few turns into tension block 200b. With the track tension reduced, tension block 200b can be pulled manually toward slide block 202b so that surface 201b clears washers 203b, FIG. 3. Now track tensioning cartridge 80b is pivoted toward the chassis about shoulder screw 208b and the slide block is released to slide toward the rear sufficiently to provide ample slack. In this way, a track can be quickly removed.

When a new track is then placed on track module, it is quickly tensioned by reversing the procedure above. That, with the tensioner cartridge 80b still pivoted in towards the chassis, and the slide block 202b located toward the rear, a track is placed over the wheels. To tension it, tension cartridge 80b is swung toward side plate 40b and surface 201b is re-engaged between washers 203b. Now, tension adjuster 204b is turned counterclockwise to tension the track until indicator groove 216b is adjacent to the front face nut feature 214b.

The Design of the Preferred Spreadable Tracks

In one preferred embodiment, tracks 70a and 70b, FIGS. 1-2 are fairly wide and spaced fairly close together to limit the dead space under chassis 14 to prevent high centering and also to improve the maneuverability of the robot in close quarters. In one example, the tracks are 6 inches wide and spaced only 14 inches apart.

Figure 15:
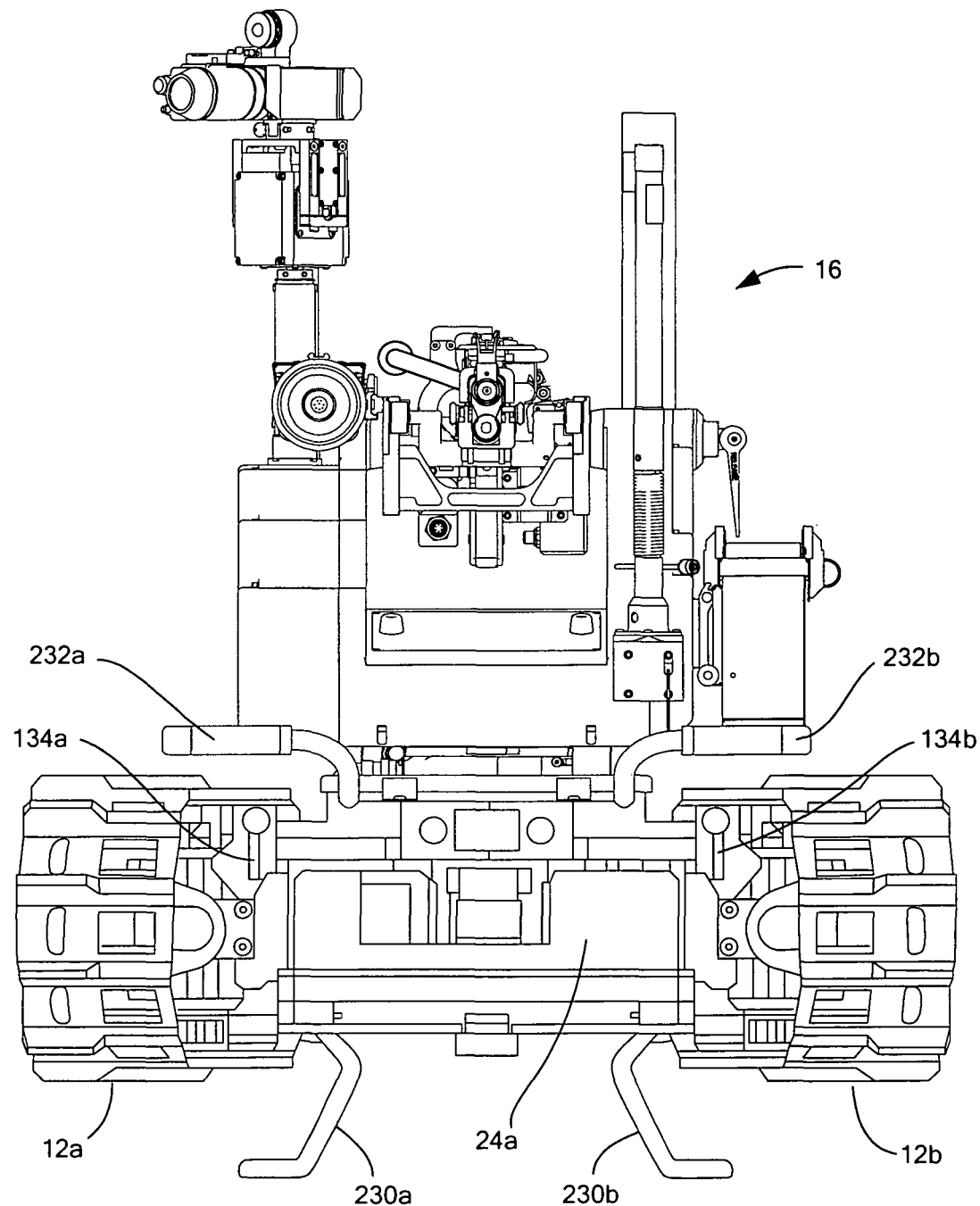
FIG. 15 is a schematic three-dimensional front view of the robot shown in FIGS. 1-2 with the tracks spread apart in accordance with the subject invention.
Figure 16:
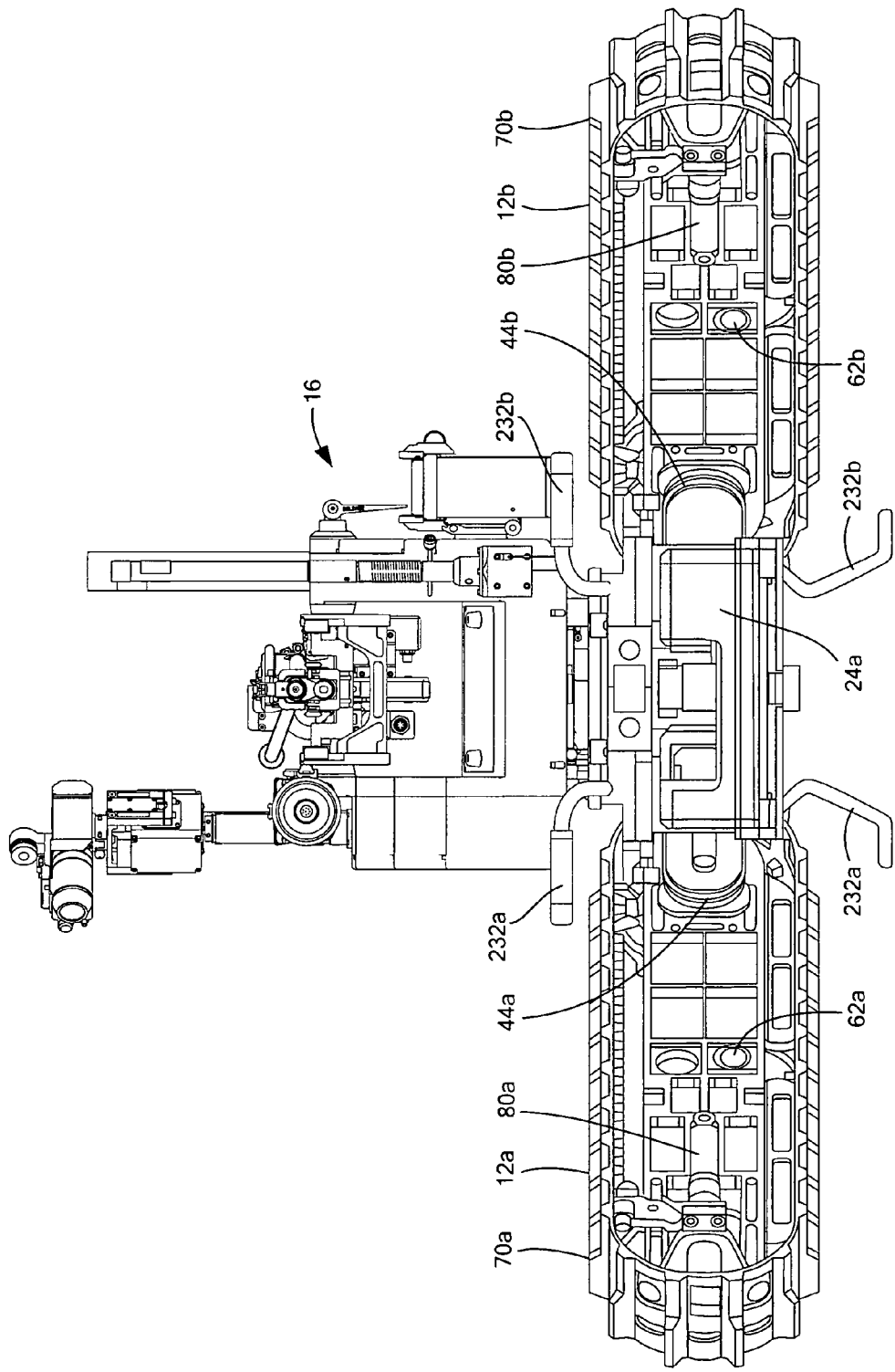
FIG. 16 is a schematic three-dimensional front view of the robot shown in FIGS. 1-2 with the tracks thereof spread even further apart.

FIGS. 15-16 show how the track modules 12a and 12b can be spread apart to access the batteries within the chassis for recharging and the like. Kickstands 230a and 230b are shown pivoted from their stored position and engaged with the ground to raise the front of the robot using handles 232a and 232b.

Clamp handles 134a and 134b (see FIGS. 6-7) are rotated to disengage the fore clamp assemblies locking the track modules 12a and 12b to the robot chassis. Track modules 12a and 12b can now be spread eight inches apart as shown in FIG. 15 or even as much as 71 inches apart as shown in FIG. 16 (by virtue of aft hinge assemblies 92a and 92b, FIGS. 2-5) to access and charge or replace batteries 24a and 24b, to repair or replace any components associated with the track modules including the motors, tracks, tensioner assemblies, idlers and the like. By removing the aft coupling hinge pins (e.g., hinge pin 110b, FIGS. 4-5), the track modules can be completely removed from the robot chassis for repair or replacement and/or to access the subassemblies housed or associated with the robot chassis.

The Preferred Turret Design

Figure 17:
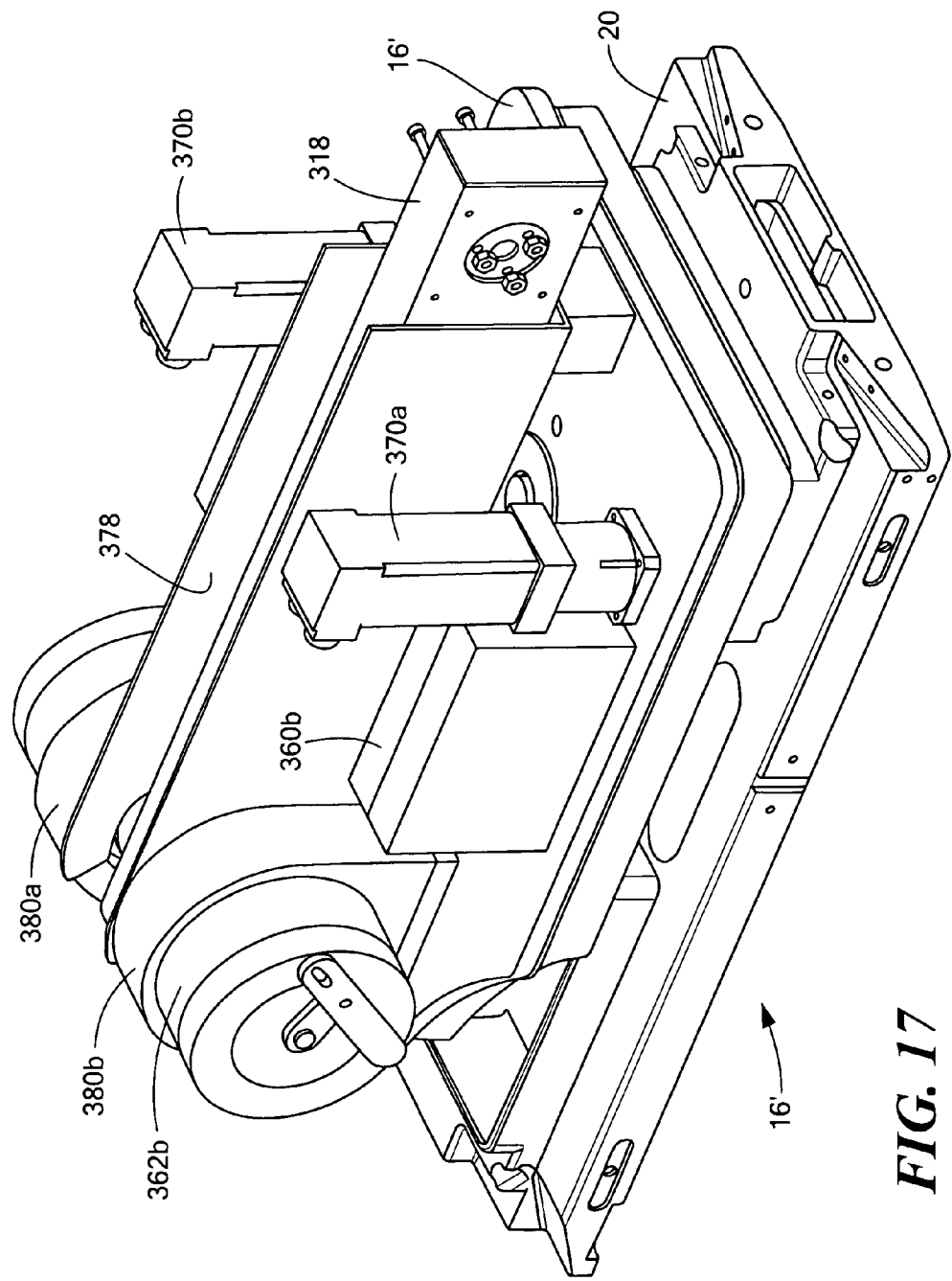
FIG. 17 is a schematic three-dimensional side view of another turret subassembly which can be used in connection with the robot chassis design shown in FIGS. 1-2.

In a similar fashion, turret 16, FIGS. 1-2 can be quickly removed from the robot chassis 14 to access any subassemblies associated with chassis 14, to repair or replace the turret, and/or to reconfigure the robot with a different style turret. FIG. 17 shows turret 16' pivotably attached to robot chassis top plate 20 and arm subassembly 318. Turret 16' is rotatably driven with respect to robot chassis 12 via motors 370a and 370b. Advantageously, as many of the electronics, cameras, and the like as possible are housed on or by turret 16' rendering it fully self contained. Also, the operation of robot lower arm subassembly 318 does not interfere with other robot components. Such a design also allows the turret and arms subassemblies to be used with different robot chassis configurations.

Lower arm 318 is shown in its stored position within storage channel member 378. Also shown in FIG. 17 is motor controller 360b, gear box 380b, and clutch 362b for the upper arm (not shown) and gearbox 380a and clutch 362a for lower arm subassembly 318. Motor controller 360b drives lower arm 318 up and down via gear box 380b and clutch 362b. Another motor/controller combination on the other side of arm 318 drives gear box 380a turning a chain within lower arm 318 in order to pivot the upper arm (not shown) within respect to the lower arm. Turret drive motors 370a and 370b each drive a gear which engages a fixed in place turret drive gear to rotate the turret. Additional details concerning such a robot arm turret subassembly are disclosed in a co-pending U.S. Patent Application entitled "Mobile Robot" incorporated herein by this reference. Other turret designs are possible. Typically, the turret features its own drive subsystem.

Figure 18:
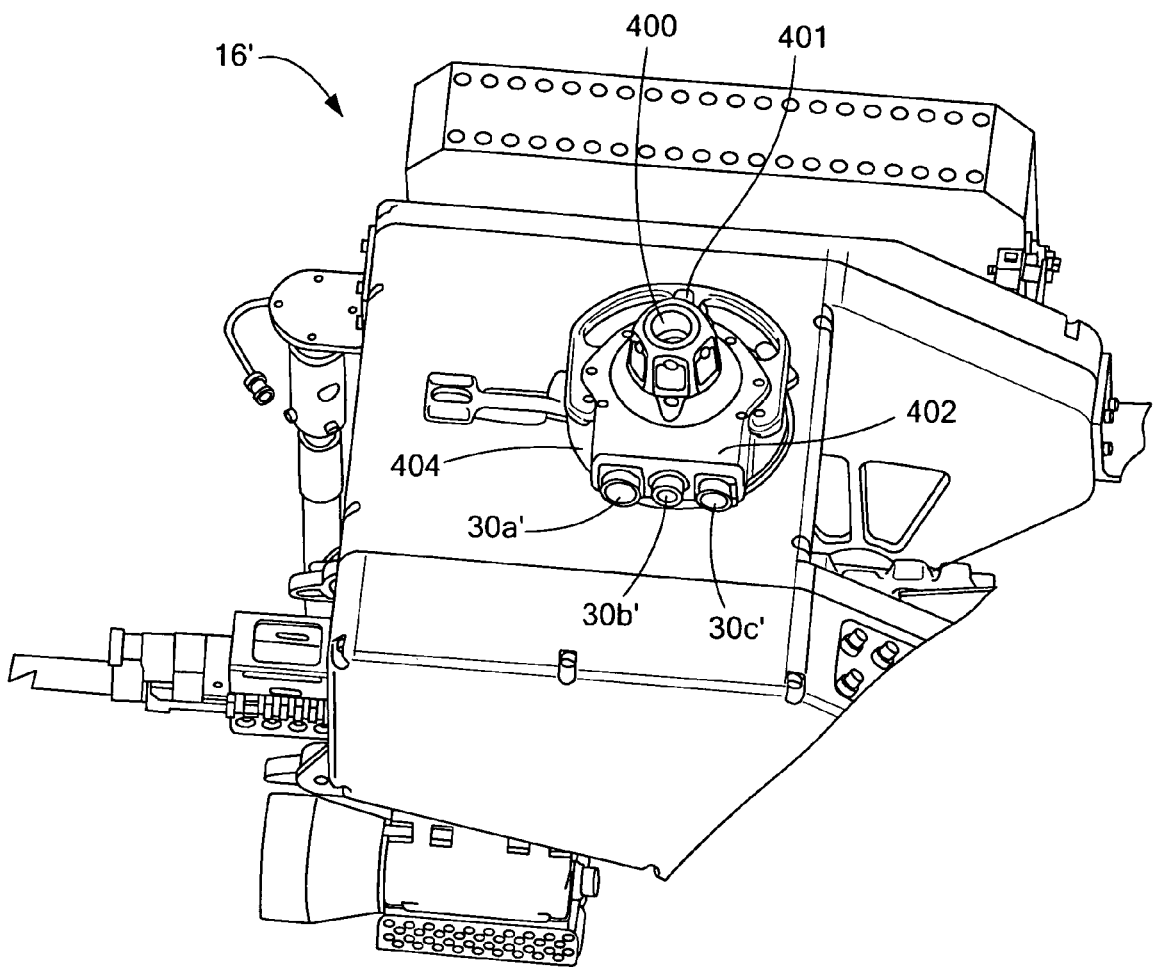
FIG. 18 is a schematic three-dimensional bottom view of a turret subassembly in accordance with the subject invention.

FIG. 18 shows turret pintle 400 extending outward from the bottom of the non-rotatable portion 402 of turret 16". Pintle 400 is releasably fitted in receptacle 32, FIG. 2 via a quick release mechanism such as a ball lock 401. Electrical connectors 30a', 30b', and 30c' associated with non-moveable turret portion 402 corresponds to electrical connectors 30a, 30b, and 30c, FIG. 2 associated with robot chassis 14. A slip ring within housing 404, FIG. 18 provides an electrical connection between connectors 30a', 30b', and 30c' and any electronic subassemblies associated with turret 16" (e.g., the turret drive motors, cameras, processors, fire control subsystems, arm drive motors, and the like).

Thus, turret 16", whether it includes arm subassemblies, weapons, or the like, is fully self contained and is easily removed from and coupled to the robot chassis via the quick release lock mechanism and the cables interconnecting connectors 30a', 30b', and 30c' and connectors 30a, 30b, and 30c, FIG. 2.

The result in the preferred and other embodiments is a new robot with a more modular design. Repair, replacement, and refurbishment of the primary robot components may be possible even in the field (and/or at repair depots, for example). The fairly wide, fairly closely spaced tracks prevent high centering and improved maneuverability in close confines. By spreading the tracks outward with respect to the chassis, access to the interior of the chassis is possible. The novel suspension subsystem and the novel track tensioning mechanism also allow the tracks to be quickly removed and replaced. The preferred track modules are self contained and thus easily decoupled from and attachable to the robot chassis. The preferred turret is also self contained and easily coupled to and decoupled from the robot chassis.

Although specific features of the invention are shown in some drawings and not in others, this is for convenience only as each feature may be combined with any or all of the other features in accordance with the invention. For example, other track modules, suspension subsystems, couplings, tensioners, and turrets are within the scope of the subject invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A modular mobile robot including:
    a robot chassis including a power supply;
    self contained left and right track modules removably attached to the robot chassis each including at least one motor driving at least one wheel;
    detachable electrical connections between the chassis power supply and said motors;
    a self contained turret assembly removeably coupled to the robot chassis and including at least a motor for rotating the turret; and
    a detachable electrical connection between the chassis power supply and the turret assembly motor.

2. The modular mobile of claim 1 in which said detachable electrical connector between the chassis power supply and the turret assembly motor includes a turret slip ring.

3. The robot of claim 1 in which the left and right track modules each include a side plate.

4. The robot of claim 3 including aft couplings which are hinges with removable hinge pins for removably attaching the track module side plates to the robot chassis.

5. The robot of claim 4 in which each hinge includes a pair of spaced ears coupled to the robot chassis, a sleeve coupled to the side plate and rotatably disposed between the ears, and a hinge pin extending between both ears and the sleeve.

6. The robot of claim 3 further including at least one suspension device between at least one of said side plates and a coupling.

7. The robot of claim 6 in which the suspension device includes a suspension cartridge comprising:
    a base plate secured to the at least one said side plate including a pin and spaced damping pads, and
    a pivot plate attached to the coupling and including an orifice which receives the pin of the base plate and a tang received between the spaced damping pads.

8. The robot of claim 7 in which there is a suspension cartridge between each coupling and its respective side plate.

9. The robot of claim 1 including fore couplings which are clamp assemblies for releasably attaching the track module side plates to the robot chassis.

10. The robot of claim 9 in which each clamp assembly includes a cam follower releasably urged against a portion of the robot chassis.

11. The robot of claim 10 in which the cam follower extends from a clamping bracket including a dowel pin spaced from the cam follower for receiving a shelf portion of the robot chassis.

12. The robot of claim 10 in which each clamp assembly further includes a clamping bracket coupled to a track side plate and including a bore therethrough having a first longitudinal central axis,
   a cam throw sleeve secured to the cam follower and including a bore therethrough having a second longitudinal central axis offset from the first longitudinal access, and
   a handle for rotating the cam throw sleeve and the cam follower to engage the shelf portion of the robot chassis.

13. The robot of claim 12 in which each clamp assembly further includes a cam locking sleeve about the cam follower and within the cam throw sleeve, the cam locking sleeve including a bore therethrough having a third longitudinal central axis adjustable with respect to the first and second longitudinal central axes to vary the clamping force of the clamp assembly.

14. The robot of claim 13 in which the cam locking sleeve includes a plurality of orifices therethrough corresponding in location to at least one orifice through the cam throw sleeve and a fastener through at least one orifice in the cam throw sleeve and a chosen orifice of the plurality of orifices in the cam locking sleeve to secure the cam locking sleeve with respect to the cam throw sleeve.

15. The robot of claim 1 in which each track module further includes a tensioner for an idler.

16. The robot of claim 15 in which each tensioner includes:
   a tension block abutting a portion of the track module,
   a slide block for the idler, and
   a tension adjuster coupled to the slide block and extendable and retractable with respect to the tension block.

17. The robot of claim 16 in which each tensioner further includes a plunger coupled on one end to the slide block and extending within and secured to the tension adjuster.

18. The robot of claim 1 in which the turret assembly includes a pintle extending therefrom, the robot chassis includes a pintle receiver for the pintle, and a quick release mechanism including a ball lock releasably securing the pintle in the pintle receiver.

19. The robot of claim 1 in which at least one of said detachable electrical connections includes a slip ring associated with the turret.

20. A modular mobile robot comprising:
   a robot chassis;
   right and left hand track modules each removably coupled to the robot chassis, each track module including a side plate; and
   fore and aft couplings removably coupling the track module side plates to the robot chassis, wherein said fore couplings are clamp assemblies including a cam follower releasably urged against a portion of the robot chassis, said cam follower extending from a clamping bracket including a dowel pin spaced from the cam follower for receiving a shelf portion of the robot chassis.

21. A modular mobile robot comprising:
   a robot chassis;
   right and left hand track modules each removably coupled to the robot chassis, each track module including a side plate; and
   fore and aft couplings removably coupling the track module side plates to the robot chassis, wherein said fore couplings are clamp assemblies including a cam follower releasably urged against a portion of the robot chassis, each clamp assembly further including a clamping bracket coupled to a track side plate and including a bore therethrough having a first longitudinal central axis,
   a cam throw sleeve secured to the cam follower and including a bore therethrough having a second longitudinal central axis offset from the first longitudinal access, and
   a handle for rotating the cam throw sleeve and the cam follower to engage the shelf portion of the robot chassis.

22. A modular mobile robot comprising:
   a robot chassis;
   right and left hand track modules each removably coupled to the robot chassis, each track module including a side plate; and
   fore and aft couplings removably coupling the track module side plates to the robot chassis, and
   at least one suspension device between a side plate and a coupling, said suspension device comprising:
      a base plate secured to the side plate including a pin and spaced damping pads, and
      a pivot plate attached to the coupling and including an orifice which receives the pin of the base plate and a tang received between the spaced damping pads.

* * * * *